(12) United States Patent
Saake et al.

(10) Patent No.: US 7,500,246 B2
(45) Date of Patent: Mar. 3, 2009

(54) SHARING OBJECTS BETWEEN COMPUTER SYSTEMS

(75) Inventors: Mark Saake, Dublin, CA (US); Richard Ruef, Livermore, CA (US); Kurt Everson, Missouri City, TX (US)

(73) Assignee: EMC Corporation, Hopkinton, MA (US)

( * ) Notice: Subject to any disclaimer, the term of this patent is extended or adjusted under 35 U.S.C. 154(b) by 336 days.

(21) Appl. No.: 10/468,184

(22) PCT Filed: Sep. 26, 2002

(86) PCT No.: PCT/US02/30841

§ 371 (c)(1),
(2), (4) Date: Feb. 6, 2004

(87) PCT Pub. No.: WO03/027882

PCT Pub. Date: Apr. 3, 2003

(65) Prior Publication Data

US 2004/0143563 A1     Jul. 22, 2004

Related U.S. Application Data

(60) Provisional application No. 60/324,578, filed on Sep. 26, 2001.

(51) Int. Cl.
*G06F 9/46*     (2006.01)
*G06F 15/167*     (2006.01)
*G06F 7/00*     (2006.01)

(52) U.S. Cl. .................. 719/312; 709/213; 707/100

(58) Field of Classification Search ................ 707/100; 719/330, 312; 709/213
See application file for complete search history.

(56) References Cited

U.S. PATENT DOCUMENTS 5,367,698 A * 11/1994 Webber et al. ............... 709/203
5,857,203 A * 1/1999 Kauffman et al. ........... 707/200
5,987,506 A    11/1999 Carter et al.

(Continued)

OTHER PUBLICATIONS

Weil et al, Dynamic Metadata Management for Petabyte-Scale File Systems, Conference on High Performance Networking and Computing, p. 4, Year of Publication: 2004.*

(Continued)

*Primary Examiner*—Meng-Ai An
*Assistant Examiner*—Camquy Truong
(74) *Attorney, Agent, or Firm*—Van Pelt, Yi & James LLP

(57) ABSTRACT

An object management system (10) comprises a storage device (12); a first computer system (12) configured to store a first object, and a copy of the first object on the storage device; and a second computer system. The first computer system is configured to create a first data object including information about the stored copy of the first object, and the second computer system is configured to read the information about the stored copy of the first object from the first data object, and retrieve the stored copy of the first object from the storage device. The first object may be partitioned by the first computer system and stored as partitions on the storage device, and the first data object would contain information about the partitions. The second computer system would be configured to read information about the partitions from the first data object, select partitions from the storage device.

14 Claims, 8 Drawing Sheets

U.S. PATENT DOCUMENTS

| | | | |
|---|---|---|---|
| 5,991,753 A | | 11/1999 | Wilde et al. |
| 6,088,694 A | | 7/2000 | Burns et al. |
| 6,108,759 A | | 8/2000 | Orcutt et al. |
| 6,128,627 A | * | 10/2000 | Mattis et al. ................ 707/202 |
| 6,182,121 B1 | | 1/2001 | Wlaschin |
| 6,269,382 B1 | * | 7/2001 | Cabrera et al. .............. 707/204 |
| 6,393,540 B1 | * | 5/2002 | Blumenau et al. ........... 711/165 |
| 6,421,687 B1 | * | 7/2002 | Klostermann ............... 707/202 |
| 6,782,389 B1 | * | 8/2004 | Chrin et al. .................... 707/10 |
| 6,877,016 B1 | * | 4/2005 | Hart et al. .................. 707/201 |
| 6,886,069 B2 | * | 4/2005 | Kawaura .................... 711/102 |
| 7,171,472 B2 | * | 1/2007 | O'Brien et al. ............. 709/226 |
| 7,266,555 B1 | * | 9/2007 | Coates et al. ................ 707/10 |
| 7,266,556 B1 | * | 9/2007 | Coates ........................ 707/10 |
| 2004/0221289 A1 | * | 11/2004 | D'Souza et al. ............ 718/102 |

OTHER PUBLICATIONS

Rotem et al., Algorithms for multidimensional partitioning of static files, Software Engineering, IEEE Transactions on, vol. 14, Issue 11, Nov. 1988 pp. 1700-1710.*

Biliris A: "An efficient database storage structure for large dynamic objects" Data Engineering, 1992. Proceedings. Tempe, AZ, USA Feb. 2-3, 1992, Los Alamitos, CA USA IEEE Computer Soc, US, Feb. 2, 1992, pp. 301-308, XP010026793. ISBN: 0-8186-2545-7, abstract, p. 301, left-hand column, line 23- p. 302, right-hand column, line 34.

Lawthers P: "The Data Management Applications Programming Interface" Mass Storage Systems, 1995. Storage At The forefront of Information Infrastructures Proceedings of the Fourteenth IEEE Symposium on Monterey, CA USA Sep. 11-14, 1995, Los Alamitos, CA USA, IEEE Computer Soc., US. Sep. 11, 1995, pp. 327-335, XP010194203 ISBN: 0-8186-7064-9 The Whole Document.

* cited by examiner

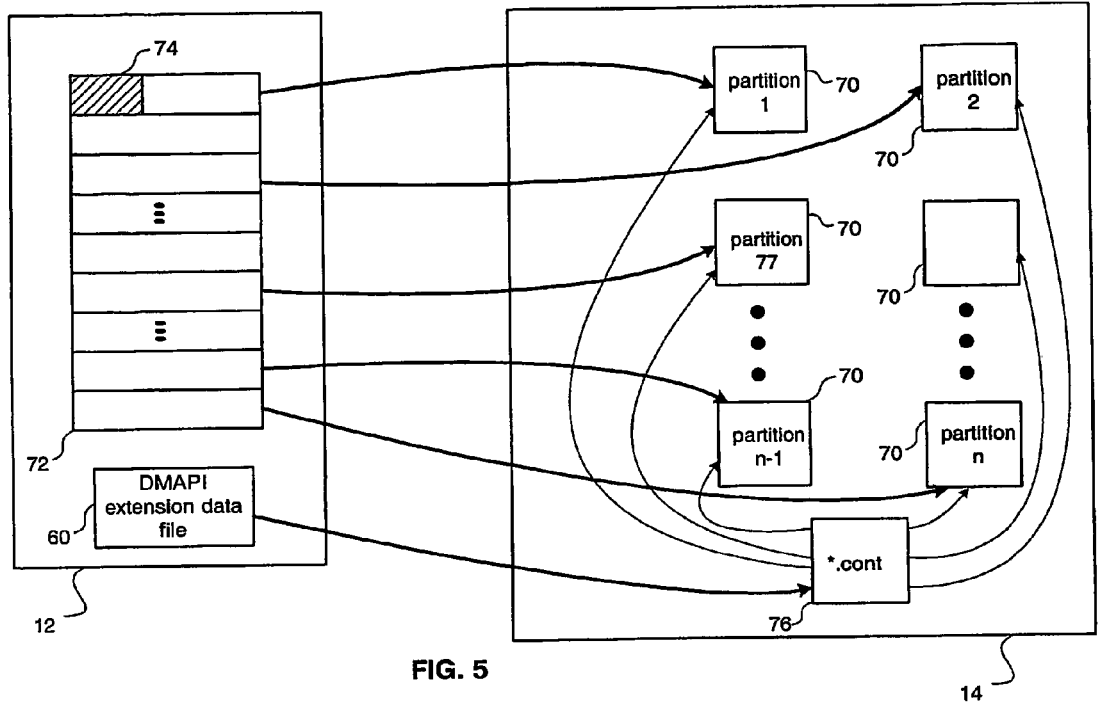
FIG. 5
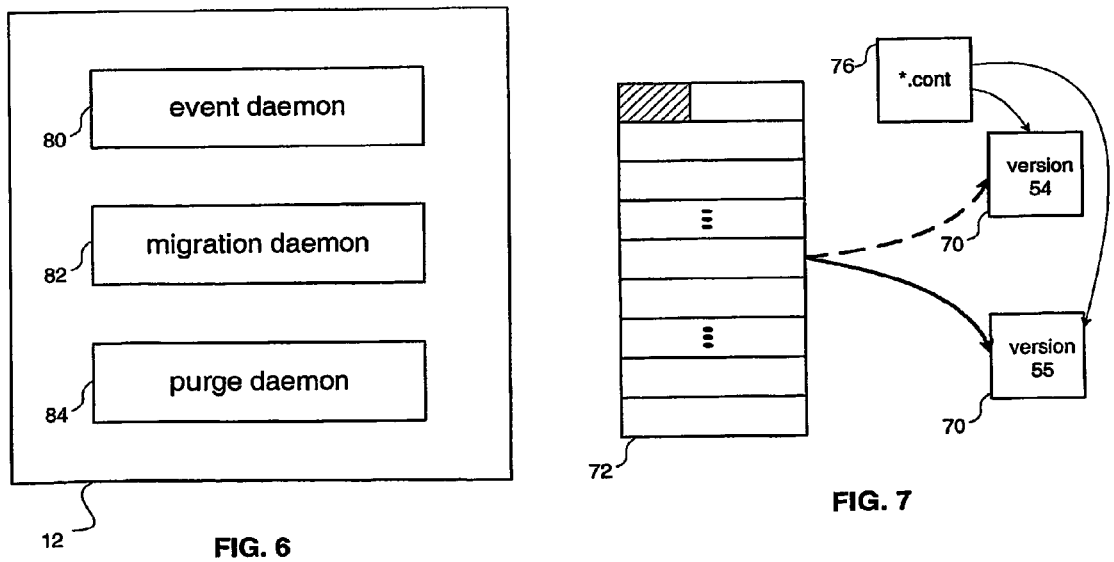
FIG. 6
FIG. 7

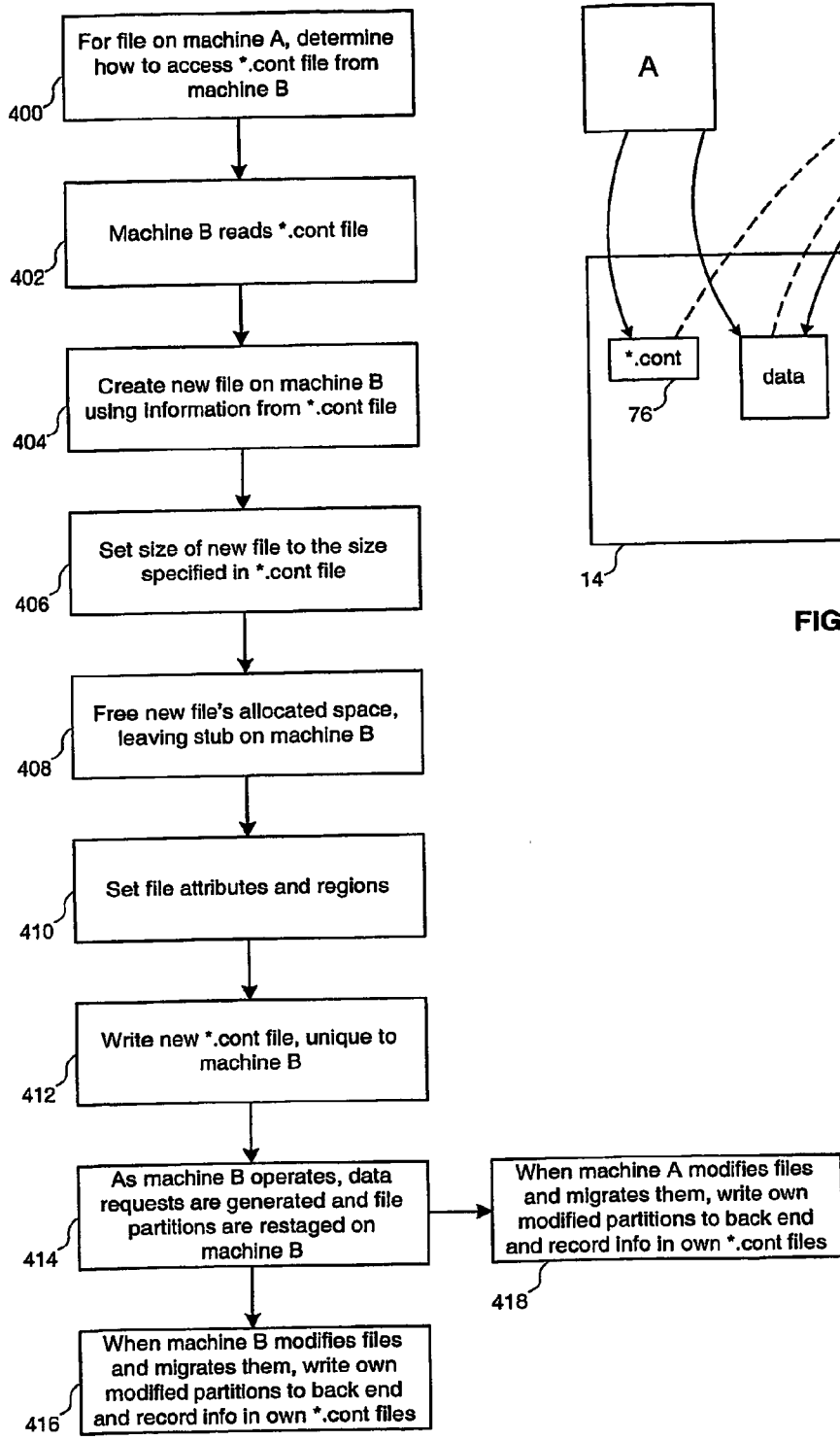
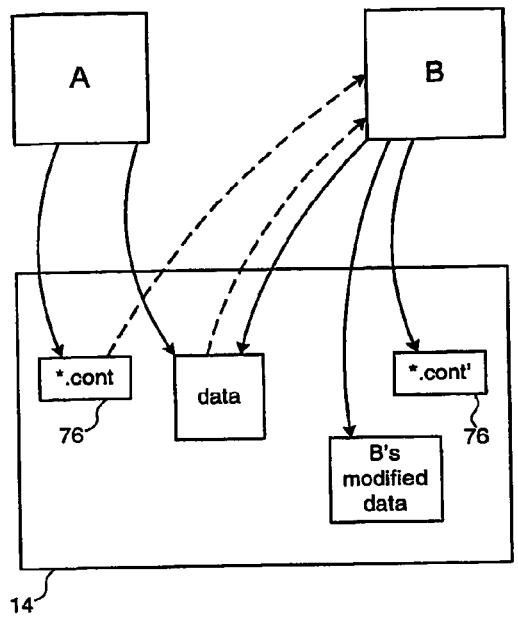
FIG. 16
FIG. 15

SHARING OBJECTS BETWEEN COMPUTER SYSTEMS

CROSS REFERENCE TO RELATED APPLICATIONS

This application claims priority to co-pending U.S. Patent Application No. 60/324,578 entitled SYSTEMS & METHOD FOR MANAGING TABLESPACES AND DATABASES filed Sep. 26, 2001, which is incorporated herein by reference for all purposes.

FIELD OF THE INVENTION

This invention relates generally to a method, article of manufacture, and apparatus for efficiently making objects available between computer systems. More particularly, this invention relates to sharing one computer system's objects with another computer system in an object management system in which they share the same back end storage device.

BACKGROUND

This invention relates to management of large files in an object management system.

Existing systems, such as those used with Oracle databases, are designed to handle extremely large tablespaces. A tablespace may be made up of a plurality of data files, which are files that may be accessed or manipulated by an operating system. "Data file" refers to a file that can be copied, moved, or otherwise treated as contiguous information, regardless of whether the data is physically stored in a contiguous manner on the storage media.

Local storage capacity may not be sufficient to store an entire tablespace associated with one or more databases. It may be uneconomical to purchase sufficient fast access storage media (such as hard disks or optical media) to provide enough capacity to store an entire database, particularly when not all of the data need necessarily be accessible at relatively fast speeds. Conventional database systems have been implemented in which data may be "migrated" to less expensive media and retrieved from the media only when required. However, existing systems and methods do not efficiently manage data to be migrated, after migration, and after retrieval. These systems suffer from latency, have high bandwidth requirements, require long backup times, have high costs, and may not be capable of making "point in time" snapshots.

These problems are not limited to databases and tablespaces. Rather, they may apply to systems that store large files, such as multimedia.

A more effective approach, as will be disclosed herein, would reduce the latency and bandwidth requirements, reduce cost, and require a smaller backup window, thus managing the data more efficiently. Although the disclosure herein may describe the problem and the invention in the context of databases and tablespaces, the invention may be applied to any data management system using migration, particularly when the system manages large data files such as audio or video.

SUMMARY OF THE INVENTION

Briefly, therefore, this invention provides for a method, article of manufacture, and apparatus for sharing objects in an object management system. In an embodiment of the invention, an object management system comprises a storage device; a first computer system configured to store a first object, and a copy of the first object on the storage device; and a second computer system. The first computer system is configured to create a first data object including information about the stored copy of the first object, and the second computer system is configured to read the information about the stored copy of the first object from the first data object, and retrieve the stored copy of the first object from the storage device.

The first object may be partitioned by the first computer system and stored as partitions on the storage device, and the first data object would contain information about the partitions. The second computer system would be configured to read information about the partitions from the first data object, select partitions, and retrieve partitions from the storage device.

The advantages and further details of the present invention will become apparent to one skilled in the art from the following detailed description when taken in conjunction with the accompanying drawings.

BRIEF DESCRIPTION OF THE DRAWINGS

The present invention will be readily understood by the following detailed description in conjunction with the accompanying drawings, wherein like reference numerals designate like structural elements, and in which:

FIG. 5 is a block diagram of a file, DMAPI extension data file, container files, and partitions stored in the back end;

FIG. 6 is a block diagram showing the daemons used in the object management system;

FIG. 7 is a block diagram showing the versioning of partitions;

FIG. 15 is a flowchart illustrating the use of container files to make data from one computer available on another computer; and FIG. 16 is a block diagram of the computers in FIG. 15.

DESCRIPTION OF THE INVENTION

A detailed description of an embodiment is provided herein. While the invention is described in conjunction with that embodiment, it should be understood that the invention is not limited to any one embodiment. On the contrary, the scope of the invention is limited only by the appended claims and the invention encompasses numerous alternatives, modifications, and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein program instructions are sent over optical or electronic communication links.

Overview

Figure 1:
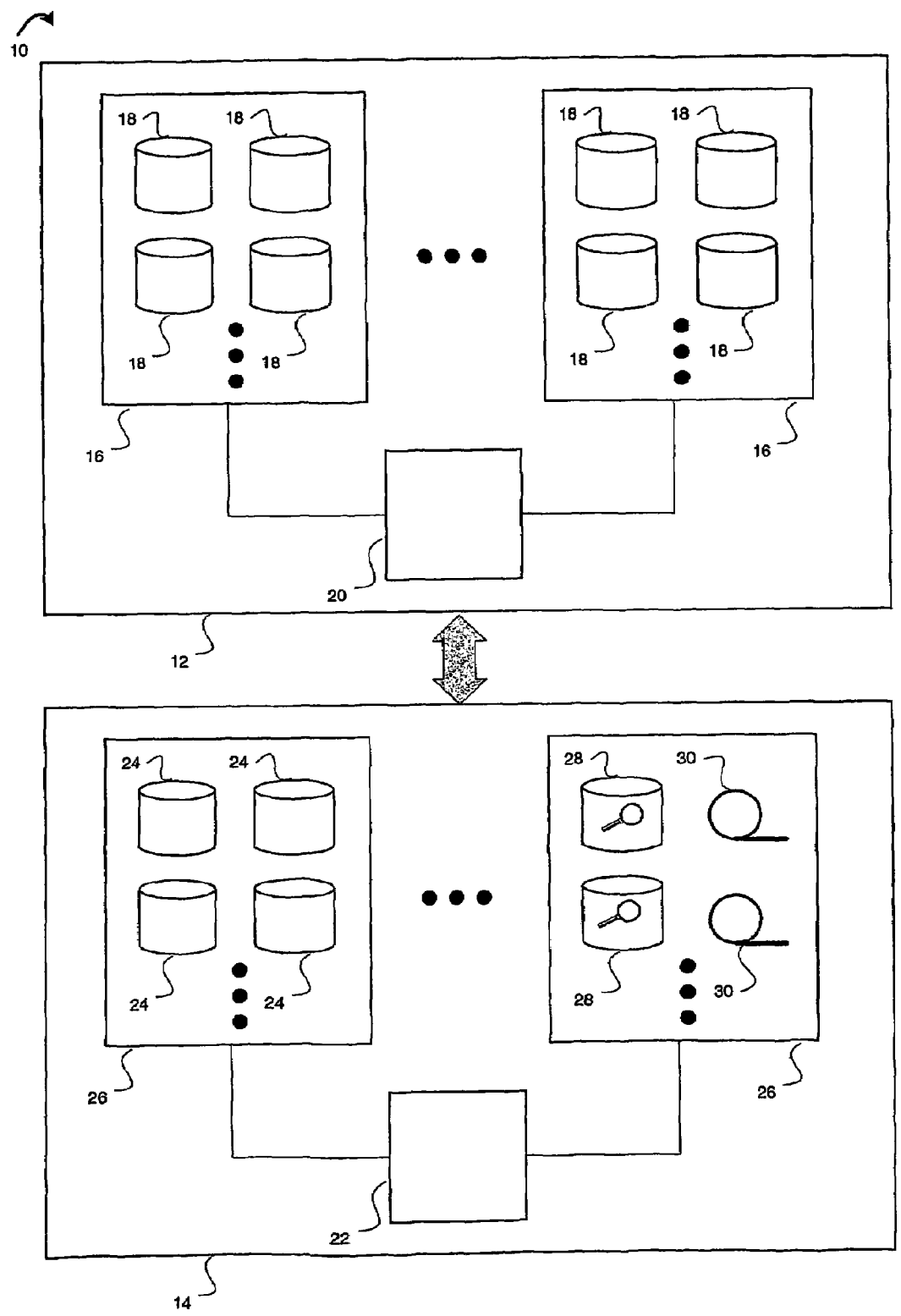
FIG. 1 is a schematic of an object management system with a front end and a back end.

In an embodiment, an object management system 10 comprises a primary, or local, computer system 12 and a storage system 14, which may be a secondary or remote computer system, as shown in FIG. 1. The primary computer system 12, which may be referred to as the front end 12, provides primary application and data storage services to a user (not shown). During normal operation, the primary computer system 12 runs applications on its CPU 20 and provides access to local data on its local filesystems 16, which generally comprise high-speed devices such as hard disk drives 18 singly, in a RAID array, or other configuration. The storage system 14, also referred to as the back end 14, may be a general purpose CPU 22 connected to various mass storage devices that may be organized into filesystems 26, or may be a specialized storage appliance. The mass storage devices used in the back end 14 may be hard disk drives 24, or other devices that are cheaper, slower, or intended for archival purposes. For example, optical disks 28, tape drives 30, and magneto-optical drives may be used. The back end 14 may be used as inexpensive near-line storage of seldom-accessed data, and may also be used to back up data on the front end 12.

The back end 14 may be located in the same place as the front end 12, or be remotely located. Data transfer is accomplished via NFS, AFS, FTP, or other method. The front end 12 and back end 14 can be connected in a one-to-one, many-to-one, or many-to-many relationship. The filesystems 16 on the front end 12 are generally in one-to-one relationships with the back ends 14, but there may be several filesystems 16 on a front end 12 each mapping to a different back end 14. This configuration can be used, for example, when each filesystem 16 is used for a different application that belongs to a different group in a company. Thus, data for an accounting department might go to one back end 14 system, while data for payroll might go to another back end 14. These back end systems 14 may be in different remote locations.

In operation, a migration daemon migrates (copies) data from the front end 12 to the back end 14; that is, it copies data from the front end 12 to the back end 14. The data is broken up into partitions that are written to the back end 14. Once a file has been migrated, it is marked as migrated on the front end 12. This is done by setting a bit or other flag indicating that the file has been migrated. A purge daemon looks for migrated files whose data is no longer needed on the front end 12, and purges unneeded data. An event daemon traps data access events, and if data is needed on the front end 12, it restages data from the back end 14 to the front end 12. The event daemon is configured to move portions of the file that are needed, so that only part of the file may be restaged. This has the advantage of reducing the amount of data being transferred, thereby reducing bandwidth requirements and latency.

Periodically, the migration daemon checks for files (or rather, parts of files) that need to be migrated. If it finds a restaged file that is marked as dirty (i.e., it has been written to since its last migration to the back end 14), it will migrate the file to the back end 14. The migration daemon is configured to write only the partitions that have been modified. Unmodified partitions need not be written, thereby reducing the amount of data being transferred. At the back end 14, the modified partitions are versioned and written to the mass storage devices. They may also be written over the currently existing partitions, but preserving earlier versions allows point-in-time snapshots to be created, so that the state of the system at any given time may be preserved. Information about the location of the partitions and other metadata are written to container files, which may be located on high-speed storage in the back end 14. In this configuration, backups are created by virtue of the operation of the system, and separate backups are not required, because the container files contain all of the information needed to restore the data to the front end 12.

These operations are performed transparently, without need for special intervention on the part of the application user aside from setting partition size and other configuration and environment information.

Such a system may be used to make data from one computer system available to another computer system without needing to copy all of the data. In order to accomplish this, the second computer system is configured to use the first computer's container files on the back end 14 to create its own files on its local filesystem. The second computer system creates its own container files, either during the setup or as needed, when it writes its own data to the back end 14. During operation of the second computer, data accesses will result in restaging of needed partitions of files from the back end 14 if they are not present on the front end 12.

If either computer system modifies the data, it will write its own partitions to the back end 14 when migrating data, and update its own container files. Thus, each computer system has its own version of the files.

The system may also be configured to efficiently search for migration and purge candidates, by storing filenames, inode numbers, and extended attributes in a single file. The system can search this file to quickly identify migration or purge candidates without having to examine the inode and possibly also the extension block for every file in the namespace. A reverse lookup using the inode number is used to determine the pathname. This approach allows the system to look up only the inodes for the migration and purge candidates, reducing the time required.

The system may be used to manage large tablespaces used by databases, but has applicability in the management of large files, particularly where data access is only to part of the file.

DETAILED DESCRIPTION

Figure 2:
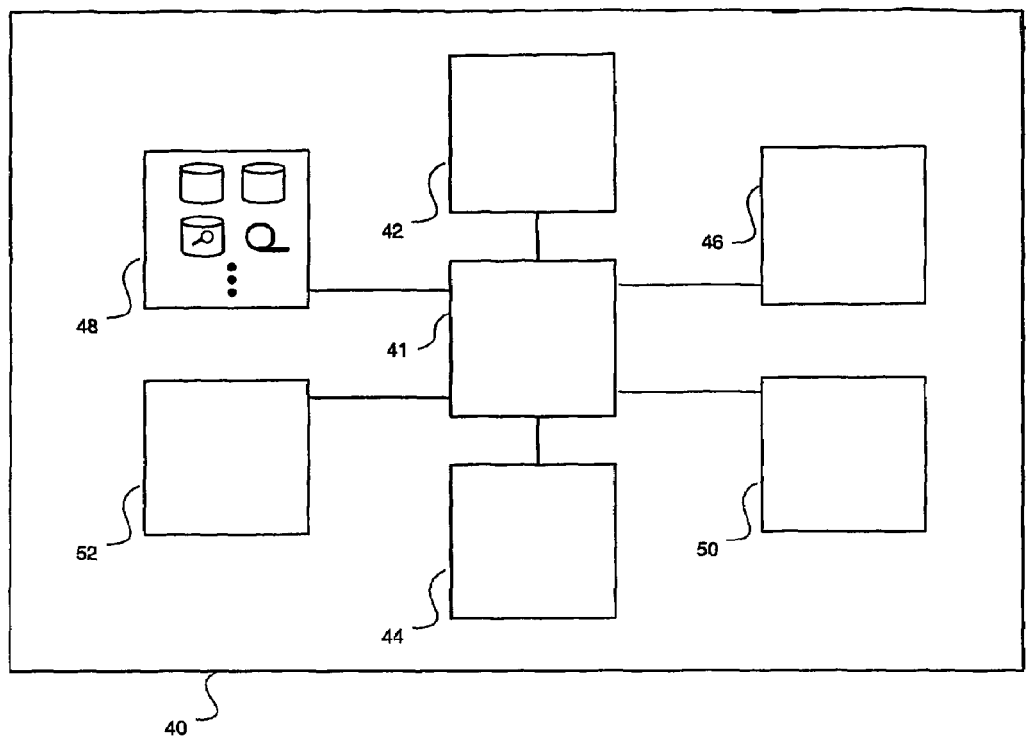
FIG. 2 is a schematic of a computer system with mass storage devices attached.

In an embodiment, the primary and secondary computer systems each comprise a software program being executed on a general-purpose computer such as a workstation running Unix, but other computer systems may be used, such as an Intel Pentium-based PC running a Windows or Linux operating system. Other means of implementing the computer system may be used, such as a special-purpose hardwired system with instructions burned into a chip such as an application specific integrated circuit (ASIC) or field-programmble gate array (FPGA). The secondary computer system, which is used as a storage system, may be implemented in the form of a specialized storage appliance such as those made by EMC, Network Appliance, StorageTek, and ADIC, connected in a Network Attached Storage (NAS) or Storage Area Network (SAN) configuration. The computer system 40 may have any number of the following: central processing unit 41, memory 42, a display 44, a keyboard 46, mass storage devices 48, a network interface 50, and other input or output devices 52, shown in FIG. 2. In accordance with common practice, the memory 42 and the mass storage devices 48 can be used to store program instructions and data. The computer system 40 may further have more than one central processing unit 41, such as a multiprocessor Pentium-based system or Sun SPARCstation. The mass storage devices 48 may comprise one or more hard disk drives, optical drives, tape drives, magneto-optical drives, DATs, CD drives, DVD drives, or other devices for storing data, using a RAID, Fibre Channel, or other interface.

The mass storage devices 18 may be organized into filesystems, and more than one set of mass storage devices 18 may be used.

The filesystem, which is a type of object store, may store files (in which case the ID of the object is its pathname) or objects (in which case the object is referred to by some ID other than a filesystem name). An object store has the following components: a way to identify objects; interfaces that allow the manipulation of objects (API, filesystem primitives, etc); and storage for the object. A file may be considered to be a type of object. The principles disclosed herein apply equally to objects and object stores as well as files and filesystems. For an object store, the extended attribute describing where to find objects in the back end would be an object ID instead of a file name.

The primary computer system, which serves as the front end 12, generally has high-speed storage in the form of hard disk drives 18 for fast access to data. The storage system, which serves as the back end 14, will have some high-speed storage as well as slower but more economical devices such as tape backups 30 and optical drives 28. Other archival devices may be attached to the storage system 14. The back end 14 is used for storage of data that is infrequently accessed, so that the need for expensive high-speed storage space is reduced.

The back end 14 may also be implemented as part of the primary computer system 12, so that the storage devices of the back end 14 are attached to the primary computer system 12. Although the disclosed embodiment describes separate primary and secondary computer systems for the front end 12 and back end 14, respectively, a separate secondary computer system is not required to implement the invention.

The primary computer system illustrated conforms to the specifications of Systems Management: Data Storage Management (XDSM) API, Document Number C429, published by The Open Group (formerly X/Open) as UK ISBN 1-85912-190-X, the disclosure of which is hereby incorporated by reference. This document is available online at http://www.opengroup.org, and sets out specifications for Data Management API (DMAPI) compliant applications. Other operating systems may be used, if they provide support for the data management functions described herein.

Figure 3:
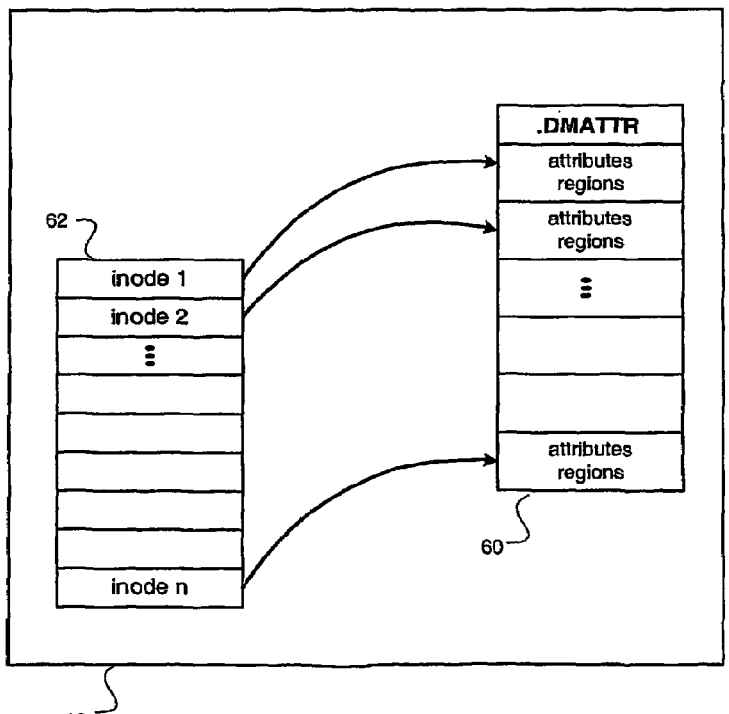
FIG. 3 is a block diagram of the logical relationships between inodes and the file in which DMAPI information is stored.
Figure 4:
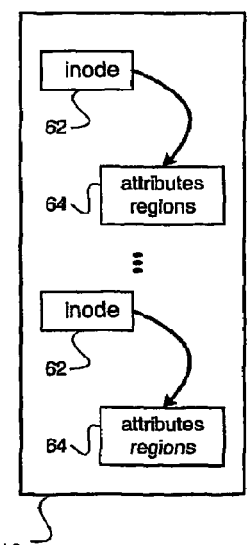
FIG. 4 is a block diagram of the logical relationship between an inode and an extension block in which DMAPI information is stored.

In a Unix or Linux system, the operating system uses inodes to store standard filesystem information, such as size, ownership, dates, and permissions. The inode may also be used to store a link to DMAPI extension data, which comprise extended attributes/metadata and region information, as specified by the XDSM specification. Preferably, the DMAPI extension data are stored in a DMAPI extension data file 60, called .DMATTR in one embodiment. The DMAPI extension data file 60 may be a single file or span several files, stored in the front end 12 but also possibly in the back end 14. Storage in the front end 12 provides faster access, as would caching in memory. FIG. 3 shows the logical relationships between the inodes 62 and the DMAPI extension data file 60 in filesystem 16. Although the elements are shown grouped together, it should be understood that this does not necessarily reflect their physical locations on disk. The DMAPI extension data file 60 may be implemented as a table of extended attributes and regions, indexed by inode number, as shown in FIG. 3. Another arrangement might have each inode 62 point to its own extension block 64, as shown in FIG. 4. Storing DMAPI information in the .DMATTR file 60 permits DMAPI information for a file to be read without having to read its inode 62 and the DMAPI extension block 64, which is advantageous when many files are being scrutinized. This information may be stored as part of the filesystem 16 as well, similar to how inode information is stored.

The extended attributes are used to keep track of information such as whether a file has been migrated, whether it has been purged, and a link to the container file 76 on the back end 14 in the form of directory path, object ID, etc. The region information includes information about the partitions of the file, such as whether the data in a partition is locally present, whether the data is dirty and in need of migration, and the location of the data in the corresponding local file. Flags may be used, and the location of the data in the local file may be indicated by information about offset and length. The region information may contain a field that specifies the set of events to be generated when data is accessed or altered in the mapped region of the file; e.g., dm_region_read, dm_region_write, dm_region_truncate. The flags may be set to indicate if data is resident, or dirty and in need of re-migration. If the partitions are dynamically sized, information about the size of the partition may be kept as well. The number of regions that map a file may increase when data is accessed, since region information is used to keep track of data location.

When a file 72 is migrated to the back end 14, it is divided into partitions 70, as shown in FIG. 5. The size of the partition 70 may be fixed, or it may be dynamically variable. Fixed partitions may have the partition size defined by a configuration or environment variable stored in a system file. Partition sizes can be selected depending on filesystem characteristics, the size of the files, and the pattern of data access. The partition size should not be too large, because larger partition sizes may result in more latency, bandwidth usage, and more space used in the back end 14 for versioning. On the other hand, a partition size that is too small increases housekeeping requirements, as there are more partitions to manage. For large databases, a partition size of 100 megabytes (MB) may be used. Thus, for example, a 2 GB file would be divided into 20 100 MB partitions for the back end 14. In one implementation, the system is used for an Oracle database, with 9840 tapes for the back end 14, and 16 partitions of size 128 MB. Some factors that affect partition size are the access patterns of the application needing the data, speed of data transfer between the back end 14 and the front end 12, speed of the archive media in the back end 14 for data transfer, and latency of the back end 14 media. Back end media with slower positioning times (such as tape 30) would militate in favor of larger partition sizes.

By partitioning the file 72, the system is able to move data in smaller portions 70. If an application requests data access to only a small portion of data from the 2 GB file, only the particular 100 MB partition containing that data would need to be retrieved for access if it is not present on the local filesystem. This reduces latency, as the time required for moving the data is much smaller, and reduces bandwidth usage due to the smaller amount of data being moved. Similarly, if only a small portion of a data file 72 is subsequently modified, only the partitions 70 containing the modified portions of data will need to be migrated to the back end 14.

As shown in FIG. 6, the primary computer system is configured so that in operation, there are three daemons: an event daemon dxdbmigd 80, a migration daemon dxdbmigwatch 82, and a purge daemon dxdbpurgewatch 84. Any number of daemons may be used, including just one daemon that is threaded, and other approaches other than daemons may be used. For example, a Windows system may use system agents and services. The event daemon 80 traps when file data is accessed. If the data requested is not present on the local filesystem 16 on the front end 12, the event daemon 80 copies data from the back end 14 to the local filesystem 16, and the data access then takes place. The migration daemon 82 looks for files whose data needs to be migrated from the front end 12 to the back end 14. Once it has identified files whose data needs migration, it copies data from the front end 12 to the back end 14. The purge daemon 84 looks for files whose data is no longer needed on the local filesystem 16, and removes unneeded data. Both the migration and purge daemons 82 and 84 may be configured to run periodically, such as at five-minute intervals, because the efficient search for migration and purge candidates described herein permits looking up migration and purge candidates at little cost.

Figure 8:
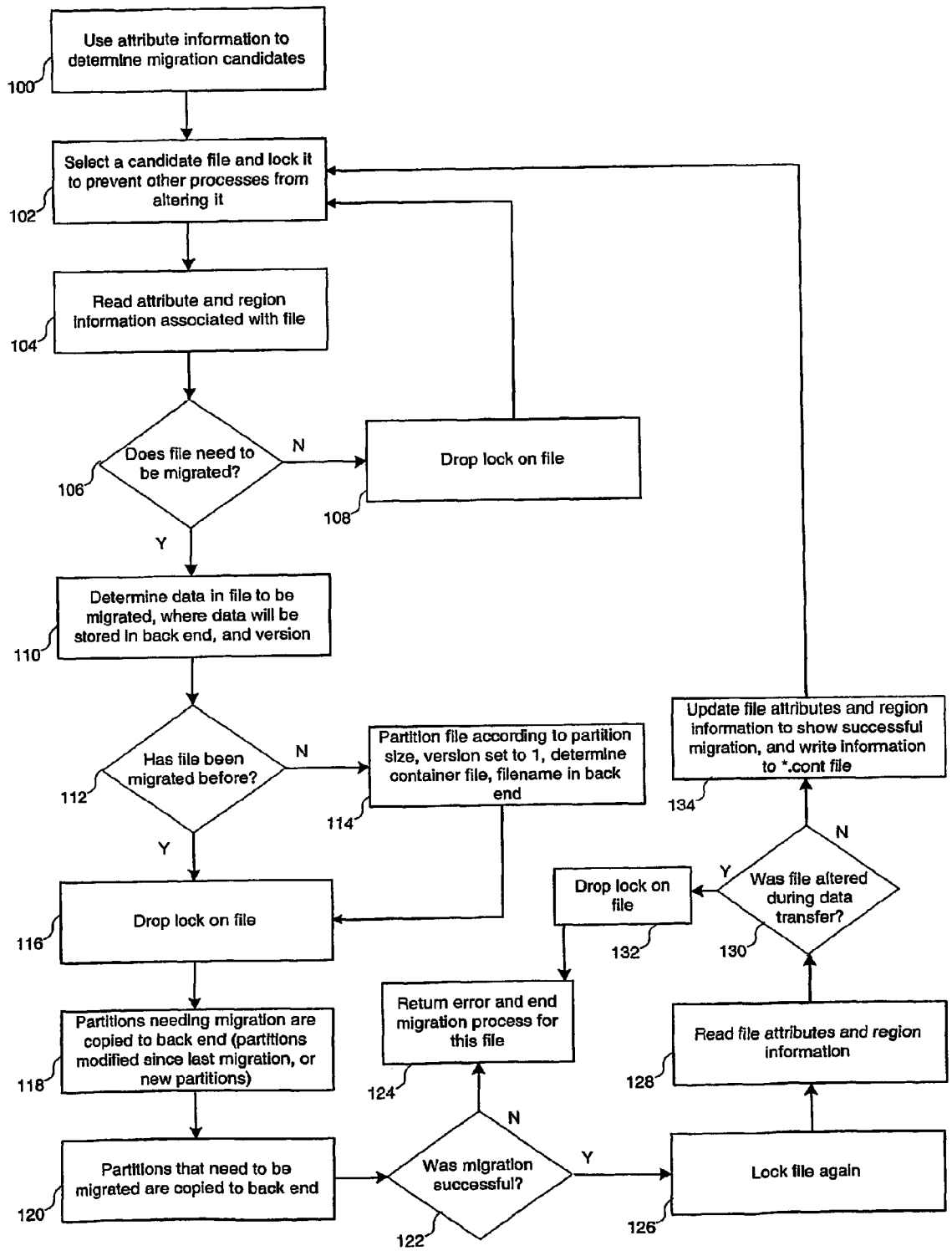
FIG. 8 is a flowchart illustrating the migration process.

Referring to step 100 in FIG. 8, the migration daemon 82 (or a single daemon that is threaded) uses the attribute information stored in the .DMATTR file 60 to determine whether files need to be migrated, or may use attribute information stored in extension blocks 64, as described herein. If a file 72 has not been migrated before, it is broken up into partitions 70 that are either a fixed size or dynamically determined. The partition size may be dynamically determined, based on factors such as frequency of data access, how much contiguous data is read per access, and other access pattern information. The migration daemon 82 may fork other processes to handle various tasks. Semaphores, file locks, and other methods may be used to protect the file during pre-migration processing, data migration, or while checking whether the file has changed during the migration (if it has, fail the current migration and attempt migration the next time).

The migration process exclusively locks the file, step 102, reads the attribute and region information, step 104, and determines whether the file needs to be migrated, step 106. If no migration is needed, the lock is dropped, step 108. Otherwise, the region information, file size, and partition size are used to determine which pieces of the file will need to be migrated, step 110. If the file was previously migrated, step 112, there will be a container file 76 that includes information describing previous migrations, and this file will be read to determine the new version number for the file. If the file has never been migrated, this version number is assumed to be 1. Only new data or data altered since the last migration will be migrated into the back end 14. The data is partitioned according to the partition size, which may be fixed or dynamic, step 114. The lock is dropped, so that other processing using the file can proceed while the migration is taking place, step 116.

In step 120, the partitions 70 that need to be migrated are copied to the back end 14, without altering file access times on the front end 12. If an error occurs during this migration, the migration attempt will be retried during the next migration run, step 124. If the migration was successful, the file is again locked in step 126, and the file attributes and region information will again be read and used to determine whether the file was altered during data movement, step 128. If the file was altered, the lock is dropped, step 132, and because the data may be inconsistent, the migration fails and will be reattempted later, step 124. If no alterations to the file were made during data movement, the file information is updated to show that the file has been successfully migrated, step 134. The extended attributes (such as DMAPI/XDSM) and region information are updated, and information about the file, including pathname, size, owner, permissions, and other file attributes, is written to a container file 76, called a *.cont file, which is associated with the data file. Also written to the container file 76 is information about the partitions stored in the back end 14, including versioning information.

Figure 9:
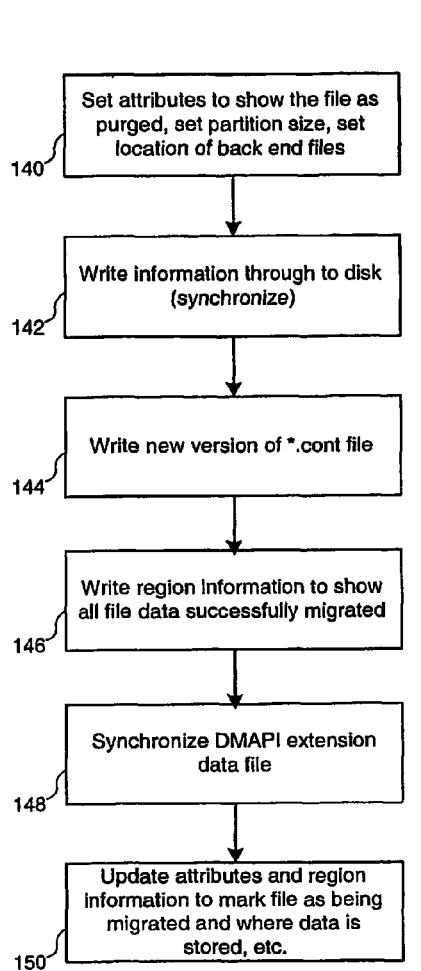
FIG. 9 is a flowchart illustrating the updating of file state to ensure consistency.

The file state must be updated in a specific order to guarantee consistency. In FIG. 9, step 140, the attributes are set to show that the file has not been purged, the partition size of the file is set (if necessary), the location of the back end 14 files is set, and the information is written through to the filesystem 16, step 142. This guarantees that in case of a crash, enough information is present in the file to enable the file to be accessed, either by rolling forward to the new state or back to the previous state. A new version of the *.cont file 76 is written in such a way as to guarantee that the *.cont file 76 contains the old state or the new state of the file, step 144. In step 146, the region information is written through the DMAPI/XDSM interface to show that all file data has been successfully migrated to the back end 14, and then in step 148, the .DMATTR file 60 is synchronized (outstanding information is written to disk). If this fails, the old region information will still be valid, so future migrations can proceed during future migration attempts. The DMAPI/XSM attributes are updated to mark the file as being migrated, step 150. This includes setting the metadata to show where the data is stored in the back end 14, the time of migration, and to mark the file as being migrated. The metadata is written in such a way that failure at any time will always leave the file in a consistent state.

This guards against data corruption in the event of a failure, and prevents the file from being in a state that allows access to possibly invalid file data. The state stored in the region information, the file metadata, and the back end version file (the *.cont file) are enough to restore the file if necessary after a purge or to recover the file if the locally managed disks are lost or the file is inadvertently removed.

Each data file 72 may have a *.cont file 76 associated with it, but it is also possible to store the *.cont information for multiple data files in a single container file, which could be indexed by the name of the data file or other identifier, such as object ID. If the file has been migrated before, the region information in the .DMATTR file 60 is checked to determine which partitions are dirty; i.e., have been modified since the last migration. The modified partitions are copied to the back end 14, and may be versioned, so that they do not overwrite existing copies of the partitions. The *.cont file 76 keeps track of the versions, as shown in FIG. 7.

For example, if the *.cont file 76 indicates that version 54 of a partition already exists in the back end 14, the modified partition is written as version 55 without altering or overwriting version 54, and the *.cont file 76 is updated to reflect the operation. In effect, the *.cont file keeps track of the file deltas. It has the information necessary to recover the associated file as it existed at any point in time, because the *.cont file 76 effectively keeps snapshots; i.e. at any particular date and time, it is possible to determine what the data file 72 looked like. After migration is complete (for example, when the migrated data has successfully been written to tape), information about the newly migrated partitions is stored in the container file 76. The .DMATTR file 60 is updated to indicate that the file has been migrated, along with the link to the container file in the back end 14 if the file was migrated for the first time. If modified partitions were migrated, the region information is updated to show that the partitions are no longer dirty and thus no longer in need of migration. Thus, there are links between the file on the front end 12 and its partitions on the back end 14, stored in the .DMATTR file 60 and the *.cont file 76.

To illustrate the migration, if there were a data file on the front end 12 called ABC that had not been migrated before, a unique pathname would be chosen for it in the back end 14, say 123. The ABC file is broken up into partitions with the partition size determined by the object management system configuration. These partitions are copied to the back end 14 as individual files that indicate the unique pathname, partition number, and version number; e.g. 123.partition1.version1, 123.partition2.version1, up to 123.partitionN.version1. Then a 123.cont file is written, which describes what has been done during the migration, including filename on the local filesystem 16, names of partitions, and versions of partitions.

Additional information is written to the local filesystem 16 in the .DMATTR file 60 or other place in the filesystem. Although it could be located elsewhere, placement on the local filesystem 16 speeds up access. The .DMATTR file 60 could also be cached in memory on the front end 12, though this would necessitate synchronizing the cached file with the file on disk frequently to ensure consistency in the event of a crash. The attributes written include an indication that the file ABC has been migrated to file 123, timestamp indicating when the migration occurred, where the file has been migrated, and an indication that the file has been successfully migrated to the back end 14.

Figure 10:
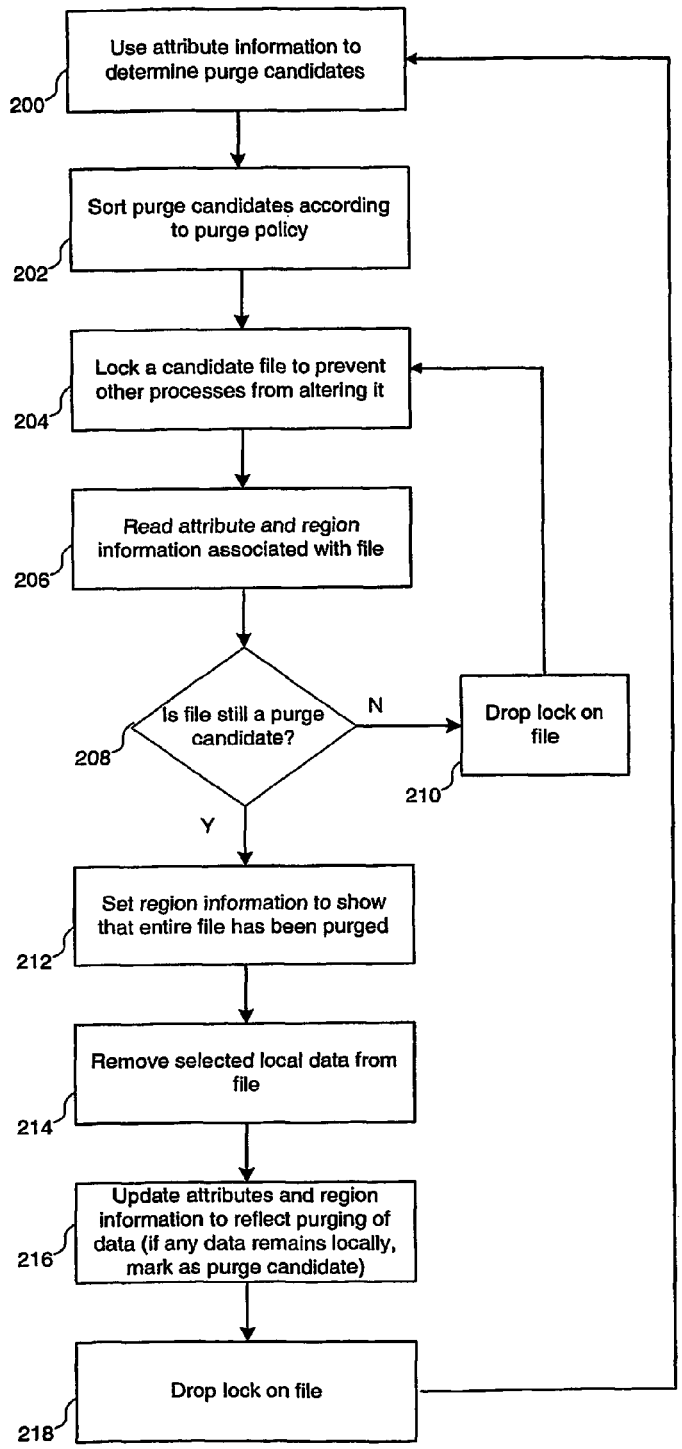
FIG. 10 is a flowchart illustrating the purge process.

Referring to FIG. 10, the purge daemon 84 (or threaded daemon) identifies files that have been migrated (not in need of migration) but not purged, using the attribute information stored in the .DMATTR file 60, step 200. The purge daemon 84 may do this after determining that free space is needed on the local filesystem 16, and stop purging when enough free space is available. In step 202, the purge candidates are sorted according to the purge policy in effect, which may be user-configurable. LRU (Least Recently Used) may be used as the purge policy, although other policies might be selected, based on the characteristics of the data stored on the filesystem 16, applications using the data on the filesystem 16, and data access patterns. Policies may be applied at the file level or at the partition level. The purge daemon 84 may use the information in the extended attributes to determine the time of last access, frequency of access, etc. of the partitions in the file. Based on the purge policy, the purge daemon 84 identifies partitions to be purged. For example, the purge daemon 84 might sort files using an LRU algorithm, and then within files chosen for purging, select partitions with last access dates older than a certain date.

File locks, semaphores, or other methods are used to prevent data loss or corruption. After the purge process compiles a list of purge candidates, and a file is selected for purging, the file is locked, step 204. The attributes and region information are read, step 206, and checked to see whether the file has been accessed since the list was compiled; i.e., whether it is still a purge candidate, step 208. If not, the file is not purged and the lock is dropped, step 210. If the file is still a purge candidate, the file region information will be set to show that the entire file has been purged, step 212. The purge daemon 84 removes local data from the file, corresponding to the selected partitions, step 214. In a DMAPI-compliant system, the purge daemon 84 uses dm_punch_hole( ) to remove the local data. Depending on the capabilities of the operating system, the local file 72 may be truncated from an offset to the end of the file, as is common with most operating systems, or a hole may be punched into the middle of the file, as provided for by AIX. The data to be removed may be at the beginning of the file, and in this case, a stub 74 is left (shown in FIG. 5).

After the local data is removed, the attributes and region information are updated to reflect the purging of data, step 216. The region information indicates that the data actually purged is no longer present on the local filesystem 16, and if the entire file has been purged (except the stub 74), the attributes indicate that the file has been purged. If any part of the file remains, the file continues to be a purge candidate. After the file metadata has been updated, the lock is removed from the file, step 218. This protects the file in the event of a system crash or other failure. The file will still be seen as a purge candidate because it has not yet been marked as purged, but all partitions in the file will cause restaging when accessed because they are marked as purged before the purge operation. Some data may still be local, but if an error occurred during the purge operation, it may not be possible to tell what was purged. Thus, the purge process marks all partitions as purged, and after the purge is complete, updates the region information to indicate which partitions are still present. If the metadata updates fail, the file will still appear to be a purge candidate, although some or all of its data may already have been purged from the local file. The sequence described is intended to prevent data corruption, but other approaches are possible as long as region information, file data removal, and file metadata updates are synchronized to guarantee consistency. This avoids leaving the file in an inconsistent state in which outdated data could be accessed.

Files 72 typically contain header and other frequently used information at the beginning of the file that is scanned by applications, and when purging a file, leaving the stub 74 in place may speed up data access time. The user may define the length of the stub 74, based on information such as whether there is information in the beginning of the file 72 that is frequently accessed, and how much data is accessed at the beginning of the file 72. For example, an Oracle database may require a stub size of at least 128 KB, because Oracle frequently accesses this data in the data files, such as at startup time, when Oracle accesses every Oracle data file. If the stub data were not resident, Oracle would stall until the data has been recovered from the back end 14, which might mean many tape mounts (or mounts of other storage media such as CDs). The stubs 74 may be versioned and stored as files or objects in the back end 14.

Figure 11:
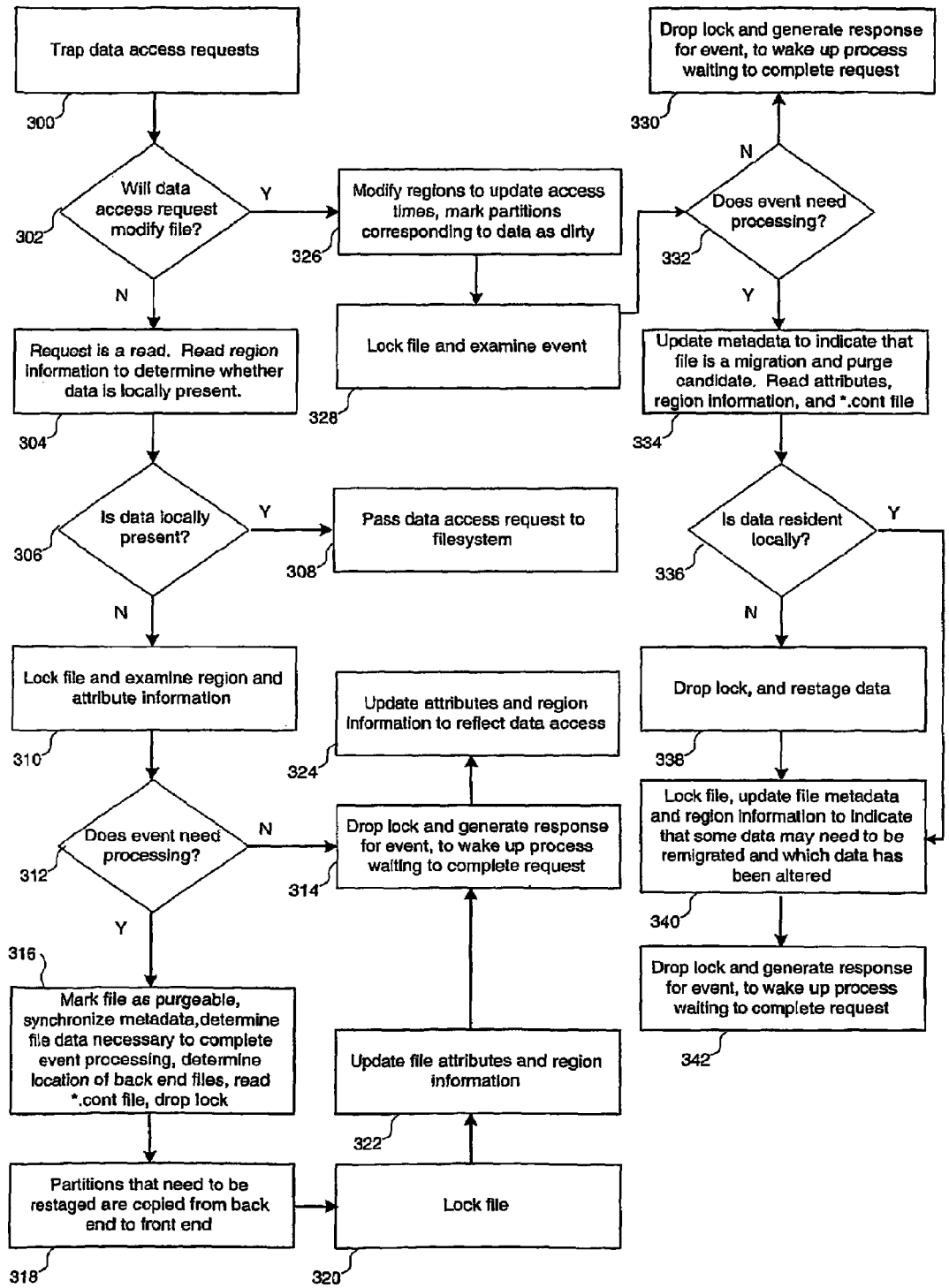
FIG. 11 is a flowchart illustrating the event handling and restaging of data.

In FIG. 11, step 300, the event daemon 80 or threaded daemon traps data access events, and keeps track of data access activity. When a data access request is issued, the processing depends on whether the data access is a read or an access that will modify the file (such as write or truncate), step 302. If the data access is a read, step 304, the region information in the .DMATTR file 60 is checked to determine whether the requested data is present on the local filesystem 16; namely, whether the region information shows that the partition corresponding to the portion of the file being accessed is marked as present. If the requested data is present, step 306, the access request is passed to the filesystem, step 308, and file attributes and region information may be updated to reflect the access, step 324. If the requested data is not present, the event daemon 80, or another process that receives the event from the event daemon 80, locks the file and checks the region and attribute information, step 310, to determine whether processing is required, step 312. In step 314, if no processing is required because of previous event processing, the lock is dropped, and a response is generated for the event, which will wake up the process waiting to complete the I/O request. If processing is required, the file is marked as purgeable, the metadata is synchronized, the file data necessary to complete event processing is determined, the location of the back end 14 files is determined, the *.cont file is read, and the lock on the file is dropped, step 316.

The file is not locked during data movement, allowing processing of data that is already resident on the local filesystem 16. The necessary partitions are read from the back end 14 and written to the local filesystem 16 on the front end 12, step 318. The file is again exclusively locked, step 320, region and attribute information is updated in a consistent manner, step 322, and the lock is dropped. A response is sent to the waiting process, waking it up to complete its read request, step 314. Future accesses to this data will not generate a restore event unless the data is purged again.

Based on data access patterns, some predictive partition retrieval may be used as well; i.e. information about data access patterns could be recorded, and if it is determined that access to a particular partition frequently results in access to another partition, that partition might be retrieved in advance.

In step 324, after the event daemon 80 handles the data access event, the .DMATTR file 60 may be updated to indicate the time of access for the partition(s) corresponding to the portion of the file accessed, such as when the purge policy uses data access information at the partition level. The system updates the file attributes to indicate the time of file access.

If the access request was a write, the regions will be modified to update access times, and the partitions corresponding to the data will be marked as dirty (and thus needing to be migrated), step 326. In this case, the file is exclusively locked, and the event is examined to determine whether processing is necessary, step 328. If not, the lock is dropped, and the event is responded to, ending processing, in step 330. If processing is necessary, in step 332, the metadata is updated to indicate that the file is a purge candidate, and also a migration candidate because the data is about to be altered. File metadata, region information, and the *.cont file are read to determine the state of the file. The area of the file that generated the event is determined, and if the region information indicates that the data is not locally present, step 336, the lock is dropped, and the data moved in a manner similar to the read process described above, step 338. If the data is already resident, no data needs to be moved from the back end 14. In step 340, after the data is restaged, the file is locked again, and the file metadata and region information is updated to indicate that some data in the file needs to be migrated, and which portions of the file have been altered. The exclusive lock is dropped and a response sent to the waiting process, step 342.

Figure 12:
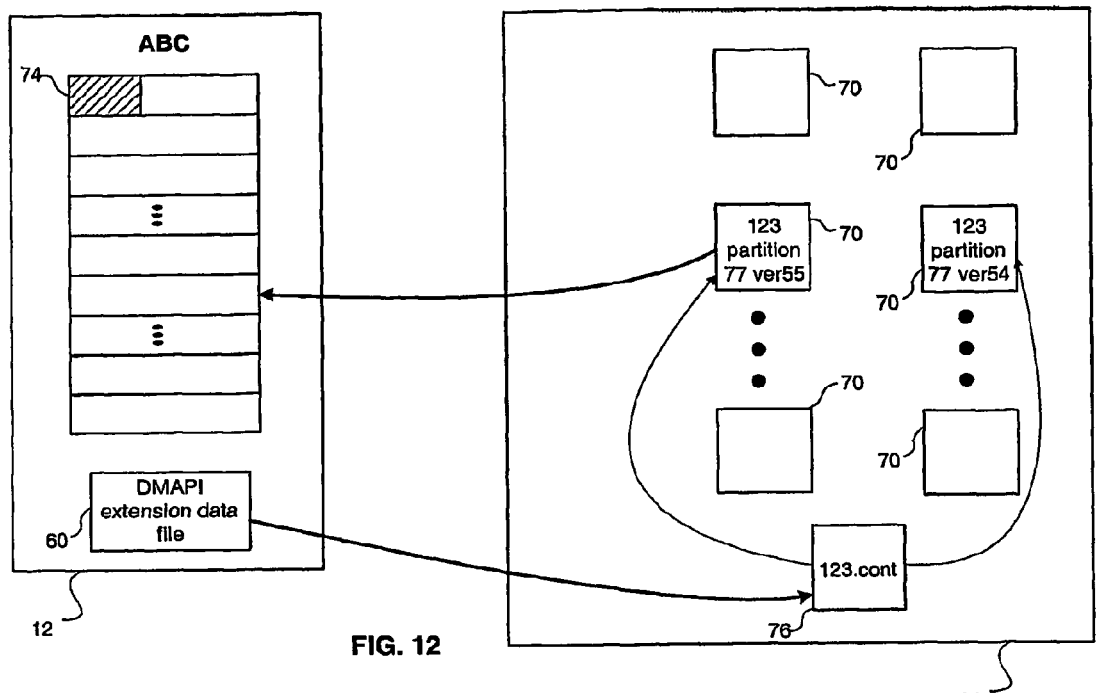
FIG. 12 is a block diagram showing the restaging of a partition.

To illustrate the event handling, for a file ABC that has N partitions that are all migrated and purged except for a stub 74 having a length defined by the configuration, a data access request to the data in partition 77 would be trapped by the event daemon 80. This is illustrated in FIG. 12. The daemon determines that the data in partition 77 is not present on the local filesystem 16, and checking the .DMATTR file 60, determines that the corresponding container file is 123.cont on the back end 14. A request for partition 77 of the corresponding back end file 123 would be issued. 123.cont might indicate that version 55 is the latest version of partition 77 of file 123, and thus 123.partition77.version55 would be retrieved to the front end 12. After restoring the partition to the disk, the attributes and region information are updated.

By migrating and retrieving segments of files rather than entire files, the system avoids large and time-consuming file transfers. For example, database files tend to be quite large, measured in gigabytes. It is impractical to move the entire file back and forth during migration and retrieval, especially when a database application such as Oracle may be accessing only a very small portion of the table (e.g. rows). Oracle, for example, does not scan an entire file at once. Rather, it scans partially through one database file, proceeds on to another file, and so forth until it finally comes back to the first file and scans more data. Using full file retrieval leads to system thrashing and longer retrieval times.

Figure 13:
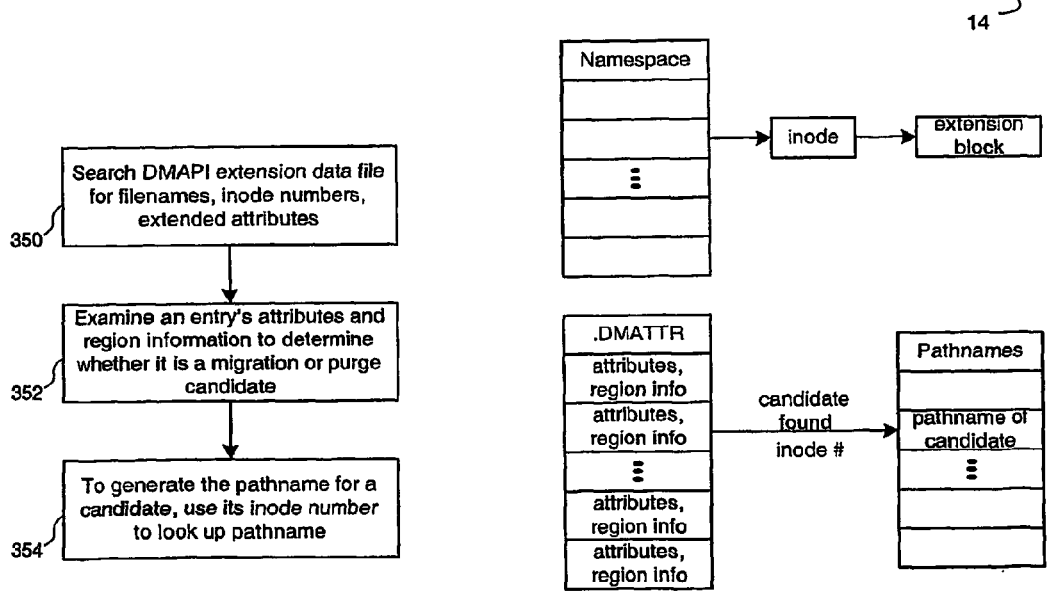
FIG. 13 is a flowchart illustrating the efficient search for migration or purge candidates and obtaining candidate pathnames.
Figure 14:
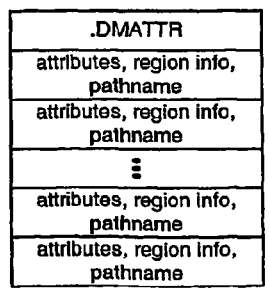
FIG. 14 is a block diagram showing several approaches to searching for migration or purge candidates.

The system is also configured to efficiently search for migration and purge candidates and obtain their pathnames, although this is not required in order to implement the partitioning of files and management of the partitions described herein. As shown in FIG. 14, one approach is to search the namespace for filenames and look up the inode and extended attributes for each file. In some configurations, the inode contains a pointer to the extension block containing the extended attributes, requiring a second lookup and corresponding disk access. In a more efficient approach, illustrated in FIGS. 13 and 14, the system searches the DMAPI extension data file 60 (the .DMATTR file), for filenames, inode numbers, and extended attributes, step 350. The system could also be configured to use a different file or several files. In this manner, the system can quickly determine which files are migration or purge candidates, step 352, without having to look up the inode, and possibly also extension block, for every file in the namespace. To generate the pathname for a candidate, its inode number is used to look up its pathname, step 354. This could be done with a reverse lookup in a list of inodes and pathnames. The list may be stored as a table in the same file, .DMATTR, or a separate file or group of files. With this configuration, the system looks up only the inodes for the files that are identified as migration and purge candidates, instead of having to examine information for all files including those that have been migrated and purged. This considerably reduces execution time and system load required for migration and purging. For example, in determining which files require migration, a system using the efficient search described herein can examine a filesystem with one million files for migration and purge candidates in less than one minute. A Solaris machine with one million files having only one migration candidate took ten seconds to find the one file, compared to the 20 minutes it took previously with the namespace search. This approach may be used with NFS-type filesystems, XFS, UFS, Veritas, and similar filesystems, using Unix-flavor operating systems such as Linux and Solaris, although it may also be extended to other operating systems and filesystems.

The use of container files 76 described herein enables data from one computer system (machine A) to be made available to another computer system (machine B) without needing to copy all of the data first (replicating the contents of one filesystem to another is often a very time-consuming process), illustrated in FIGS. 15 and 16. Machine B can be configured to use machine A's container files on the back end 14, step 400. Each container file 76 includes information about file attributes, such as size, owner, permissions, and path, which machine B may use to create a new file on its local filesystem. After machine B reads the *.cont file, step 402, a new file is created, step 404, the size of the new file is set to the size specified in the *.cont file 76, step 406, and in step 408, the allocated space is freed (as if the file had been purged), thus creating a stub file on machine B's filesystem. A .DMATTR file 60 or other extension data block or file is created, and attributes and regions are set, step 410. Container (*.cont) files unique to machine B are written to the back end 14, step 412, though this could be done on an as-needed basis, when machine B modifies data and migrates it to the back end 14. As machine B operates, data access requests will generally result in a determination that the requested data is not present on machine B's local filesystem, and the needed partitions will be copied from the back end 14 to machine B's local filesystem, step 414. The file attributes and region information will be updated on machine B in the same manner as has been described. If machine B modifies the data, the modified partitions (shown as B's modified data in FIG. 16) will be written to the back end 14 and the information about the changes stored in machine B's container files (shown as *.cont'), step 416. Machine A continues to write its own partitions and store information about its changes in its own container files 76, step 418. Each computer system writes its own modified partitions to the back end 14. Each computer system uses its own container files, and thus has its own version of the data.

The foregoing disclosure and embodiments demonstrate the utility of the present invention in increasing the efficiency of object management in computer systems, although it will be apparent that the present invention will be beneficial for many other uses. The invention has particular value in databases, video, audio, and any application in which a portion of a file may be accessed and be relevant without needing to access all of the data in the file.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the object management system; i.e. they take the place of a single computer. Various functions described above may be performed by a single process or groups of processes, on a single computer or distributed over several computers. Processes may invoke other processes to handle certain tasks. The principles disclosed apply to objects and object stores as well as files and filesystems. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. An object management system comprising:
    a storage device;
    a first computer system configured to store a first file on the first computer system, divide the first file into partitions, store the partitions on the storage device, store in a first data object information about the stored partitions, and store the first data object on the storage device; and
    a second computer system configured to:
    read directly from the first data object as stored on the storage device by the first computer system the information about the stored partitions as stored on the storage device by the first computer system,
    create on the second computer system a second file based on the information in the first data object and corresponding to the first file as described in the first data object,
    store in a second data object stored on the second computer system information about whether each of said partitions into which said first file is divided is present in the second computer system,
    select a partition based on a data access request associated with the second file,
    retrieve the selected stored partition from the storage device if the selected stored partition is absent from the second computer system, and
    store in a third data object stored on the storage device information about stored partitions associated with the second file that have been modified and stored as modified partitions by the second computer system;
    wherein the second file has an attribute that is the same as a corresponding attribute of the first file, which attribute is determined by the second computer system by reading said information from said first data object; the attribute includes a file size of the first file; and the second computer system is configured to use the file size as read from the first data object to create on the second computer system the second file having the file size.

2. The system as recited in claim 1, wherein the second computer system is configured to free space allocated to the second file after creating the second file and before reading data from the second file.

3. The system as recited in claim 2, wherein the second computer system is configured to retain a stub when freeing space allocated to the second file.

4. The system as recited in claim 1, wherein the selected partition is associated with the second file.

5. The system as recited in claim 1, wherein the information about the first file includes file size and pathname.

6. The system as recited in claim 1, wherein the second computer is configured to modify the retrieved partition and store the modified partition on the storage device.

7. The system as recited in claim 1, wherein the first computer system is configured to store in the first data object a first version data associated with the stored partitions as associated with the first file and the second computer system is configured to store in the third data object a second version data associated with the stored partitions as associated with the second file.

8. An object management system comprising:
    a storage device;
    a first computer system configured to store a first file on the first computer system, divide the first file into partitions, store the partitions on the storage device, store in a first data object information about the stored partitions, and store the first data object on the storage device; and
    a second computer system configured to:
    read directly from the first data object as stored on the storage device by the first computer system the information about the stored partitions as stored on the storage device by the first computer system,
    create on the second computer system a second file based on the information in the first data object and corresponding to the first file as described in the first data object,
    store in a second data object stored on the second computer system information about whether each partition is present in the second computer system, select a partition based on a data access request associated with the second file, retrieve the selected stored partition from the storage device if the partition is absent from the second computer system, and store in a third data object stored on the storage device information about stored partitions associated with the second file that have been modified and stored as modified partitions by the second computer system;

wherein the second computer system is configured to free space allocated to the second file after creating the second file and before reading data from the second file; the first computer system is configured to store in the first data object a first version data associated with the stored partitions as associated with the first file; and the second computer system is configured to store in the third data object a second version data associated with the stored partitions as associated with the second file.

9. The system as recited in claim 8, wherein the selected partition is associated with the second file.

10. The system as recited in claim 8, wherein the information about the first file includes file size and pathname.

11. The system as recited in claim 8, wherein the second computer is configured to modify the retrieved partition and store the modified partition on the storage device.

12. The system as recited in claim 8, wherein the second computer system is configured to retain a stub when freeing space allocated to the second file.

13. The system as recited in claim 8, wherein the second file has an attribute that is the same as a corresponding attribute of the first file, which attribute is determined by the second computer system by reading said information from said first data object.

14. The system as recited in claim 13, wherein the attribute includes a file size of the first file and the second computer system is configured to use the file size as read from the first data object to create on the second computer system the second file having the file size.

* * * * *